United States Patent [19]

Wilson et al.

[11] 4,355,230

[45] Oct. 19, 1982

[54] METHOD AND APPARATUS FOR MEASURING THE APPLIED KILOVOLTAGE OF X-RAY SOURCES

[76] Inventors: Stephen S. Wilson, 620 Felch St., Ann Arbor, Mich. 48103; Peter M. Joseph, 1804 Bolton St., Baltimore, Md. 21217

[21] Appl. No.: 208,019

[22] Filed: Nov. 18, 1980

[51] Int. Cl.[3] ........................ G01D 18/00; G01J 1/42; G06F 15/42; G12B 13/00

[52] U.S. Cl. ................................ 250/252.1; 250/394; 364/414

[58] Field of Search ............... 250/252, 394, 401, 402; 364/414

[56] References Cited

U.S. PATENT DOCUMENTS 4,189,645 2/1980 Chaney et al. ...................... 250/394

*Primary Examiner*—Alfred E. Smith

*Assistant Examiner*—T. N. Grigsby

*Attorney, Agent, or Firm*—Harness, Dickey & Pierce

[57] ABSTRACT

An improved method and apparatus for accurately measuring the applied kilovoltage (KV) of an X-ray source over a wide dynamic operating range. A pair of radiation detectors are mounted beneath a rotatable disc having disposed thereon a plurality of metallic absorbers. To measure applied KV, two exposures are required. In the first exposure, called the "calibration" exposure, the detectors are filtered by two absorbers of equal thickness ($t_1$) and the detected X-ray intensities are measured, processed, and stored in a digital memory. In the second X-ray exposure, referred to the "measure" exposure, the filter wheel is automatically advanced so that one detector is filtered by an absorber of thickness ($t_1$) and the second detector is filtered by an absorber of thickness ($t_2$). The detected X-rays are gain measured and the ratio of the signals calculated to determine the relative penetrating energy. The data from the second measurement is then modified in accordance with the data from the calibration exposure before applied KV is derived to correct for gain differences in the detectors and associated electronics as well as for any nonuniformities in the radiation striking the detectors. Offset errors and drifts in the electronics are also automatically compensated for.

8 Claims, 6 Drawing Figures

FIG. 3A.
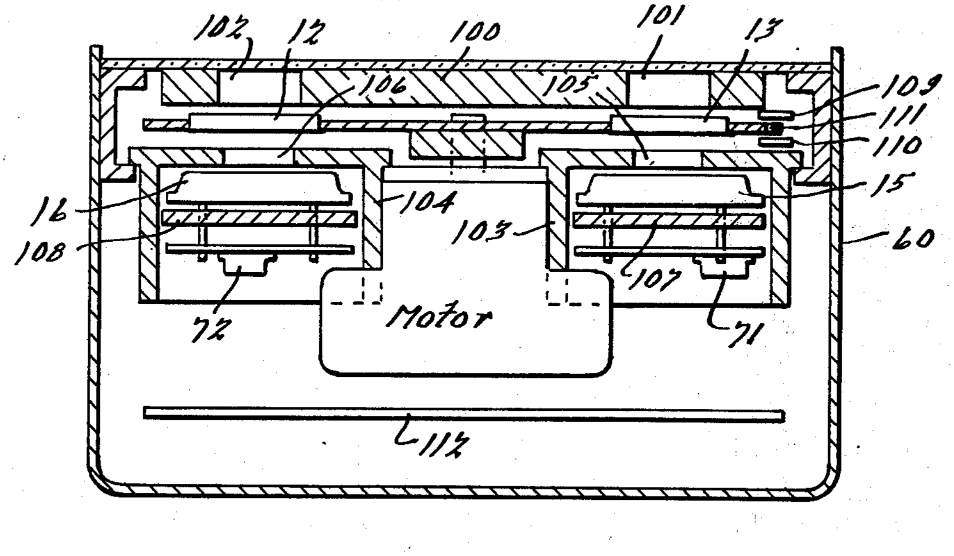
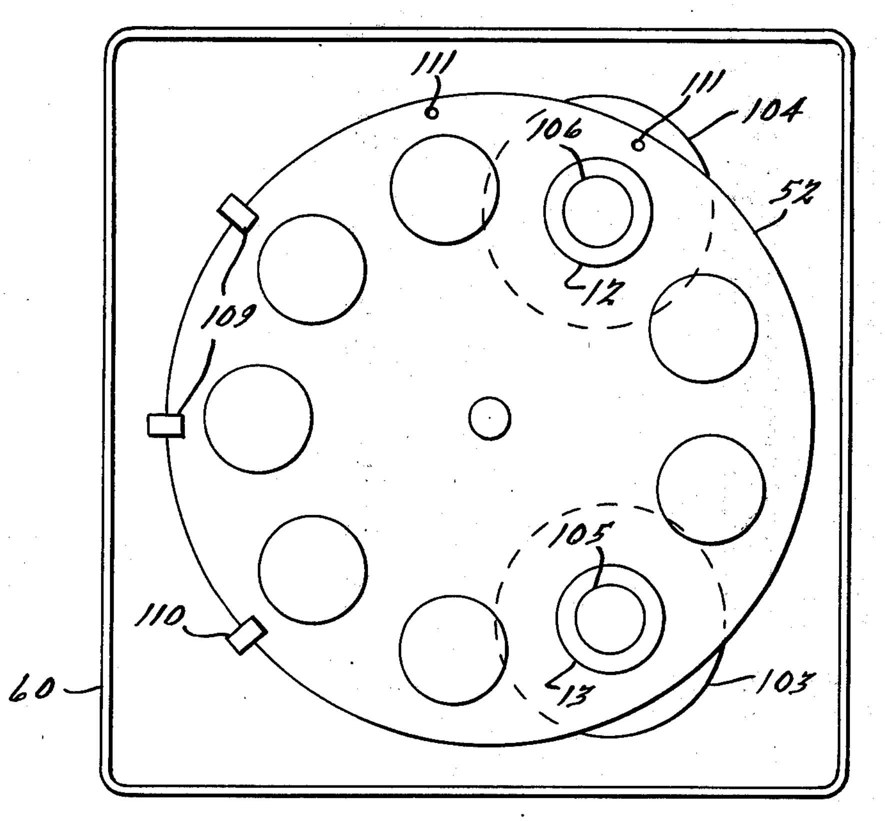
FIG. 3B.

METHOD AND APPARATUS FOR MEASURING THE APPLIED KILOVOLTAGE OF X-RAY SOURCES

BACKGROUND AND SUMMARY OF THE INVENTION

The present invention relates to a method and apparatus for measuring the applied kilovoltage of an X-ray source such as a medical X-ray machine and in particular to a method and apparatus for measuring applied kilovoltage utilizing multiple attenuation measurements through pairs of absorbers.

There is a widespread need to measure the penetrating power, as distinguished from the intensity, of X-ray sources, especially in medical and radiological equipment. Penetrating power and KV in particular are very important in the practice of medical diagnostic radiology for several reasons. The primary factor is the critical relationship between the intensity of X-ray exposure reaching the film and the KV used. For a moderal size body part, such as human head, the x-ray energy reaching the film varies approximately in proportion to the 4.5 power of the KV. This means that a 5% change in KV will lead to a 25% change in the intensity of film exposure, which will commonly lead to a degree of under or over exposure sufficient to cause a mis-diagnosis of the patients condition. This intensity to exposure conditions is due to the combination of a wide contrast range recorded on the film and the extremely subtle changes produced by many diseased states. Furthermore, the degree of image contrast obtained is primarily influenced by the KV, with different types of examinations requiring different selections of KV. For example, if a hairline fracture in the rib bone is suspected, then a relatively low KV about 60 would be used on most patients. This choice will enhance the image contrast of calcium in the bones. On the other hand, if a diseased process in the lung tissue, such as tuberculosis or cancer, is suspected then a higher KV in the range of 110 to 130 should be used to better penetrate the ribs and other bones as well as the heart. Only in this way can disease lesions which happen to lie behind the heart or ribs be seen.

In any event, it is frequently necessary to make small adjustments to the KV in order to accommodate the range of body sizes found in any patient population. Many radiology practitioners maintain technique charts listing the KV used versus body size. In this case a miscalibrated KV will produce an inadequate image which must be corrected by readjusting either the KV or other factors such as exposure time. This situation leads to unnecessary exposure of the patients. For this reason it is especially imperative that the KV calibration be uniform among the several X-ray rooms used in a radiology department. Recently, the Food and Drug Administration of the U.S. Government has recommended, and many state governments are requiring, that all medical X-ray machines be calibrated on a regular basis.

In practice, two complimentary parameters are generally used to characterize the penetrating power of an X-ray source: half value layer (HVL) and kilovolts peak (KVp). HLV is measured by determining the thickness of material (usually aluminum) necessary to reduce the reading on an air-ionization chamber to one-half the value obtained with no material. The HVL is only weakly influenced by KV.

Since applied KV will, in general, vary throughout the duration of the exposure, there are various ways of quantifying the KV used. With single phase machines, the KV applied has a sinusoidal waveform, so that the peak KV (KVp) is the common measure used. More modern X-ray machines using 3-phase current produce complex waveforms which are neither constant nor sinusoidal. In this situation a measurement of peak KV is not the most meaningful quantity. Accordingly, some sort of average or effective KV (KVe) is used.

A further desirable characteristic of any KV measuring system is that it functions accurately over a wide range of operating conditions, including variations in milliamperes (mA) of X-ray tube current and seconds of duration of exposure. Since darkening of the X-ray film is influenced by the product of mA and time, the integrated factor, mA×seconds=mAS, is used to quantify these factors. That is, it is desired to measure KVe accurately over an mAS range of approximately 1 to 100 mAS.

The most direct known method of measuring KV involves the direct interconnection of a resistor divider network into the high voltage system. This method, when used in conjunction with an oscilloscope, is capable of good accuracy if the waveform is simple—for example, either constant potential or purely sinusoidal. However, for highly complex waveform patterns such as seen on 3-phase machines, the estimation of KVe from the waveform is fraught with error. Thus, use of this method is limited principally to diagnosing certain problems in the X-ray circuitry, but is inconvenient for use in routine calibration. In addition, a major disadvantage of this approach is the necessity to carry bulky and complex equipment into the X-ray room and the dangers and inconveniences of breaking into the high voltage wiring.

It is thus desirable to be able to derive the KVe or KVp from measurements made directly on the beam of X-rays. Many methods have been suggested to accomplish this, all of which employ the same basic principle. The X-ray beam is filtered with a thickness of metal (or other substance of high atomic number (Z)) sufficiently to filter a large portion of the lower energy photons. The average energy of the remaining photons is then strongly correlated with, although less than, the applied KV. This method is more sensitive to KV changes if a high Z substance is used as the filter. The KV is commonly inferred from the ratio (R) of X-ray intensities passing through two thicknesses of filter, $t_1$ and $t_2$. The relationship between R and KV is highly non-linear so that some sort of procedure for relating R to KV must be established for any such method. Generally, it is true that increasing both thicknesses $t_1$ and $t_2$ will increase the sensitivity of R to KV and diminish the sensitivity of R to HVL, which is desirable. However, increasing the thickness of the filters also reduces the intensity of the X-rays passing through the filters, thereby necessitating the measurement of weaker X-rays and thus making more difficult the ability to measure exposures at low mAS or low KVe.

Use of increased thickness of absorbers also simplifies the problem of relating R to KV; if $t_1$ and $t_2$ are sufficiently thick then the logarithm of the detected intensity of X-rays, I, is linearly related to the thickness of the absorber used. Such a linearity is only approximate however since the curvature of the log (I) vs. (t) relationship is related to the range of photon energies present in the beam. A linear relationship is true only if the beam is homogenous, i.e., has only one photon energy. This will never be completely true for X-ray beams generated by X-ray tubes, but becomes a more accurate approximation as absorber thickness (t) is increased.

It is the primary object of the present invention to provide an improved method and apparatus for measuring the applied KV of an X-ray source.

In addition, it is an object of the present invention to provide a method and apparatus for accurately measuring the applied KV of an X-ray source over a wide dynamic operating range.

Furthermore, it is an object of the present invention to provide an accurate KV measuring device which automatically compensates for such real world factors as a non-homogenous X-ray beam, variations in detector sensitivity, long-term electronics drift and components variation.

The KV measuring device according to the present invention employs two radiation detectors which are mounted beneath a rotatable disc within which is mounted a set of nine metallic absorbers. The filter disc is rotated by an electric motor under the control of a microprocessor computer. One function of the microprocessor is to select one of three possible KVe ranges, which in the preferred embodiment are selected to be: I=40–70 KV, II=60–100 KV, III=90–150 KV. Thus, each KV range uses three filters; two are chosen to be as close to equal in thickness, $t_1$, as possible, while the third is somewhat thicker, $t_2$. In the preferred embodiment, $t_2$ is approximately 30% larger than $t_1$.

Each measurement of X-ray KVe requires that two exposures be made. In the first exposure, called the "calibration" exposure, the absorber wheel is turned so that both detectors are filtered by the two absorbers of thickness $t_1$. The detected X-ray intensities are measured, processed, and stored in the digital memory for future use. Between the first and second exposures, the filter wheel is automatically advanced so that one detector is filtered by $t_1$ and the second detector by $t_2$ thicknesses, respectively. The subsequent X-ray exposure, called the "measure" exposure, provides the additional data from which KVe can be accurately calculated. Thus, each KVe is calculated on the basis for four measurements of X-ray intensity.

The purpose of the calibrate exposure is not to measure KVe but rather to establish certain calibration factors which are important in the final KVe determination, namely: the ratio of the relative intensities falling on the two detectors, the ratio of the sensitivities of the two detectors to radiation, and the ratio of the overall amplification factors of the several amplifiers and pulse shaping networks of the two channels which transfer the detector currents to the analog to digital converters. In this way, not only is the influence of a non-homogenous X-ray beam (referred to as the "heel effect") on KVe measurement eliminated, but also eliminated is any imbalance or long term drift in the electronic amplification factors. In addition, because both filters have a thickness $t_1$ in the calibrate mode, the ratio of the readings is not influenced by the KVe of the calibrate exposure.

Furthermore, the dynamic range of the KVe measuring device according to the present invention is enhanced by eliminating low level offset voltages and currents in the first stage of amplification. This is accomplished in the preferred embodiment by a.c. coupling of the analog signals and through real time use of the microprocessor to measure and subtract these offsets. Dynamic range of the present KVe measuring device is also enhanced by the use in the preferred embodiment of a partially integrating resister-capacitor network in the feedback loop of the first amplification circuit, so that the range of voltage produced at the output of the amplifier is determined primarily by only two factors, KVe and mAS, rather than the three parameters, KVe, mA, and time.

Another design feature which enhances the useable dynamic range of the instrument is the use of only modestly thick absorbers. In the preferred embodiment, range I uses copper filters of 0.75 and 1.0 millimeter; Range II uses 1.5 and 2.0 mm of copper, and range III uses 0.5 mm of copper as well as 1.5 and 2.0 mm of tin, respectively. These choices have the advantage of being thin enough that X-ray factors as low as 5 mAS can be used at the lower end of each KVe range.

Additional objects and advantages of the present invention will become apparent from a reading of the Detailed Description of the Preferred Embodiment which makes reference to the following set of drawings of which:

BRIEF DESCRIPTION OF THE DRAWINGS

FIG. 3A is a sectional view of the detector box shown in FIG. 2;

FIG. 3B is a plan view of the nine metallic absorbers in the detector box shown in FIG. 3A;

DESCRIPTION OF THE PREFERRED EMBODIMENT

Figure 1:
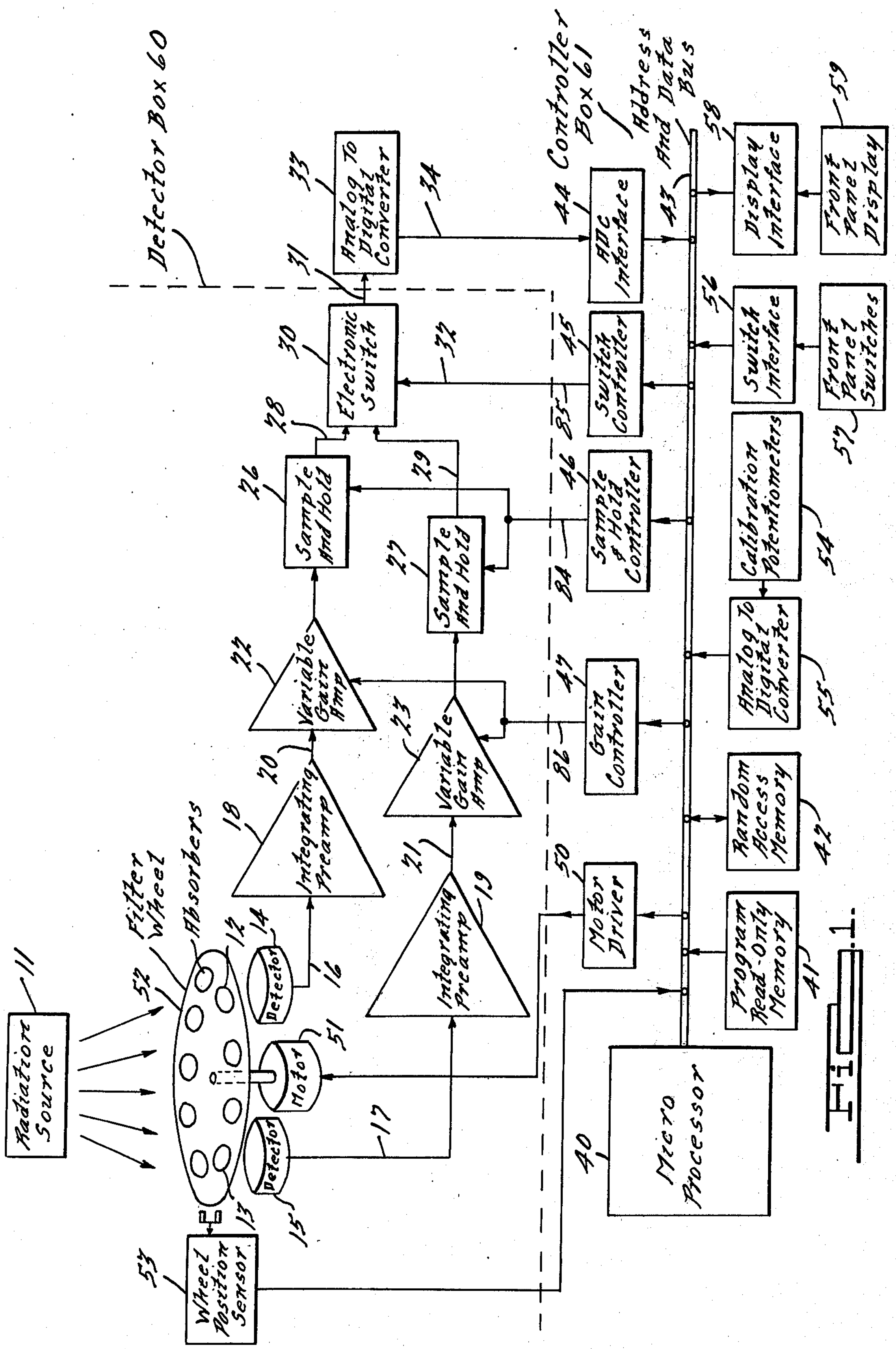
FIG. 1 is a block diagram of an X-ray measuring system according to the present invention.

Referring to FIG. 1, a block diagram of the X-ray calibration system according to the present invention is shown. X-rays from the radiation source 11 pass through two absorbers 12 and 13 and strike detectors 14 and 15 thereby causing current to flow through lines 16 and 17 to integrating preamplifiers 18 and 19. Preamplifiers 18 and 19 convert the current to a voltage which passes through lines 20 and 21 to variable gain amplifiers 22 and 23. The amplified voltages are temporarily stored in the sample and hold circuits 26 and 27. The stored voltages are connected through lines 28 and 29 to an electronic switch 30 which selects and transfers to line 31 only one of the input voltages on line 28 or 29 according to the status of control line 32. Said selected voltage on line 31 is connected to an analog-to-digital converter 33 which transforms the voltage on line 31 to a binary coded digital signal on line 34.

Microprocessor 40 operates according to instructions stored in the read-only memory 41 and uses random access memory 42 for storage of variables. Information to control the various devices of the invention are sent through address and data bus 43, wherein the microprocessor 40 can either transmit or receive digital information from the said devices. According to the program instructions stored in the read-only memory 41 the microprocessor 40 performs the following functions:

(a) receive digital information from the analog-to-digital converter (ADC) 33 through the ADC interface 44, (b) control the electronic switch 30 through the switch controller 45, (c) activate the sample and hold devices 26 and 27 by means of the sample and hold controller 46, (d) change the gain of variable gain amplifiers 22 and 23 to four different gain values by means of the gain controller 47, (e) activate the motor 51 to rotate the filter wheel 52 by means of the motor driver 50, (f) detect the position of the filter wheel 52 by means of the wheel position sensor 53, (g) read the values of six potentiometers 54 by means of an analog-to-digital converter 55, (h) by means of a switch interface 56 read the status of the manually operable front panel switches 57, and (i) transmit information through a display interface 58 to a front panel display 59 visible to the operator.

Figure 2:
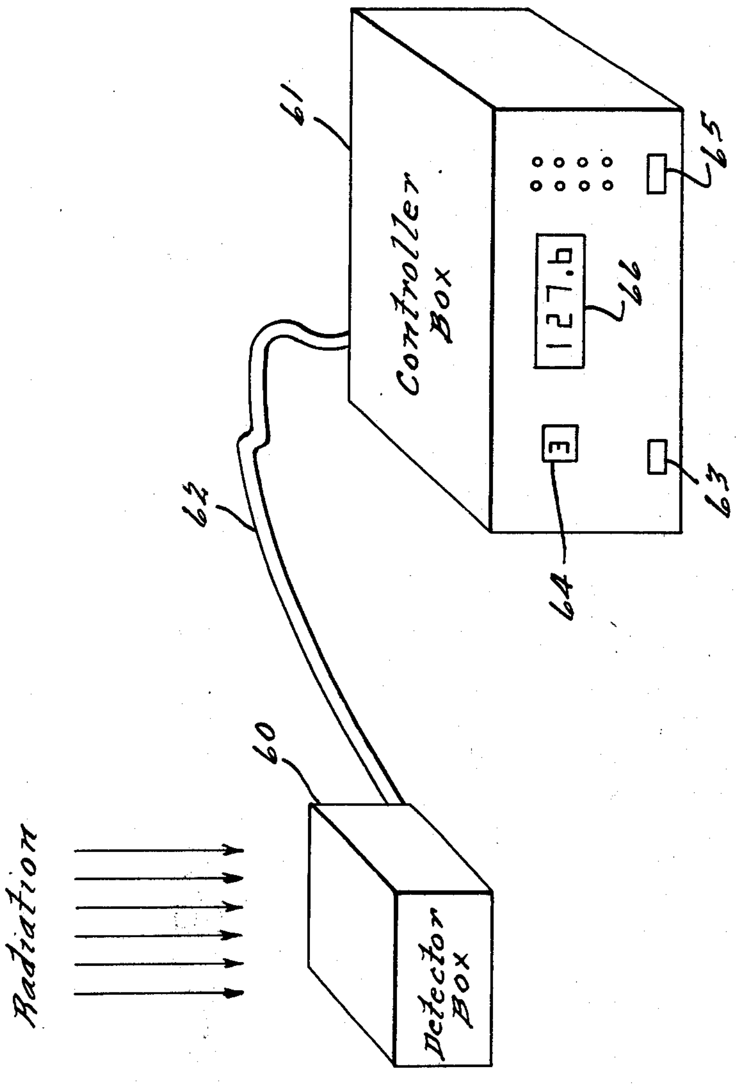
FIG. 2 is an exemplary illustration of the detector box and controller box of the present system.

As shown in FIG. 1, the system is divided into two parts: a detector box 60 which is disposed close to the radiation source 11 and a controller box 61 which is operable by the user. FIG. 2 shows a physical illustration of these two boxes with an interconnecting cable 62. The user sets the range switch 63 to correspond to the anticipated KV of the radiation source 11. In the preferred embodiment which is adapted for use with medical X-ray machines, the three settings provided corresponding, respectively, to the following three ranges: 40 KV to 70 KV, 60 KV to 100 KV, and 90 KV to 150 KV. The switch is shown on display 64. Switch 65 is set to correspond to radiation from a single phase radiation source 11, or from a three phase radiation source 11. Display 66 shows the computed KV of the radiation source or other status messages, such as the occurrence of an error.

Figure 5:
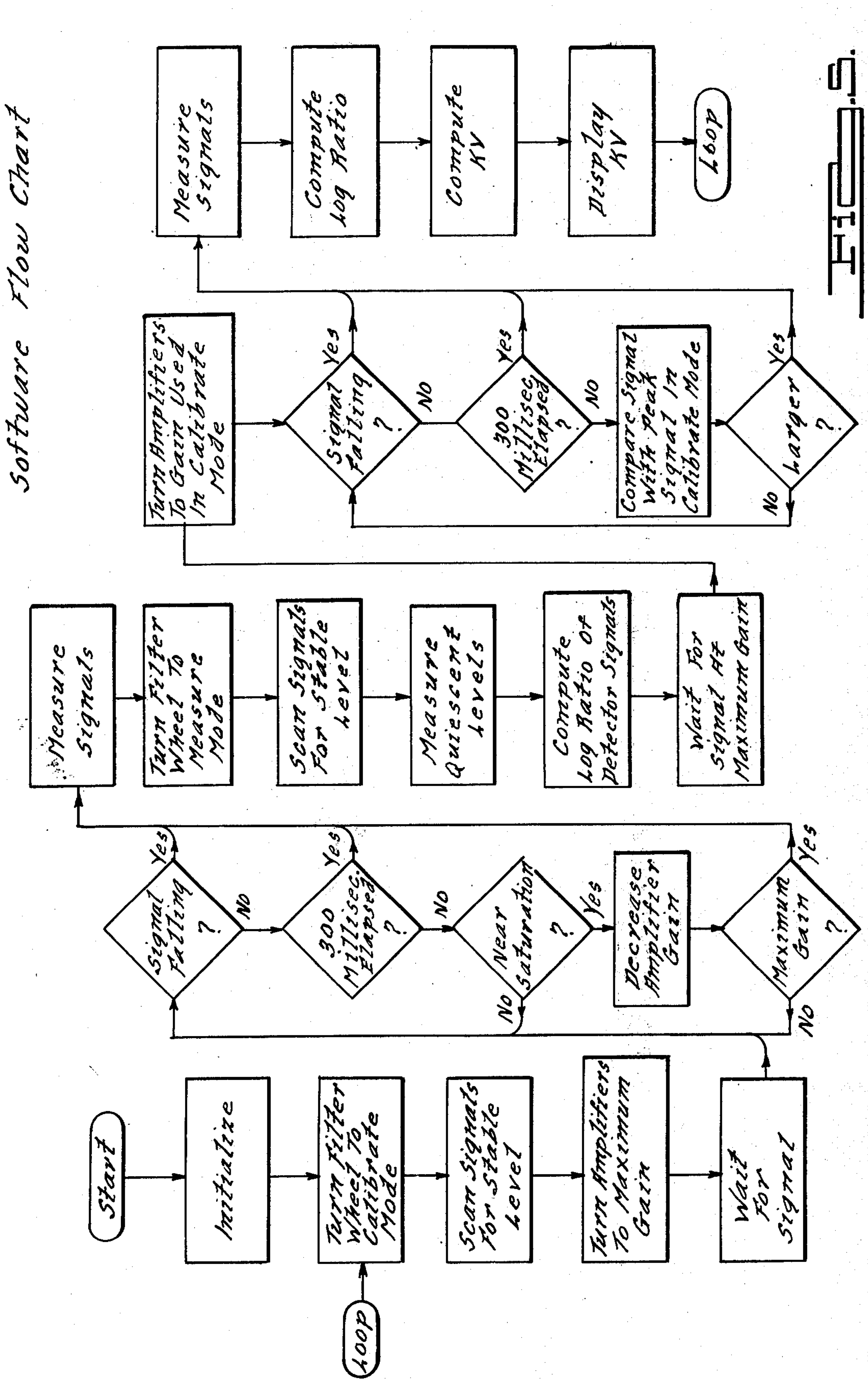
FIG. 5 is a flowchart diagram outlining the software program resident in the read-only memory in the controller box of the present system.

Referring to FIG. 5, the program in the read-only memory 41 which controls the system operation will now be described.

(a) Power on. After the supply power is turned on the display is cleared and the status of the front panel switches is read.

(b) The motor 51 is turned on so that the filter wheel begins to rotate. The wheel position sensor 53 is monitored by the computer. When the position of the filter wheel 52 is such that the two thin absorbers corresponding to the range switch 63 setting are directly over the two detectors 14 and 15 then the processor 40 signals the motor 51 to stop.

(c) Variable gain amplifiers 22 and 23 are switched to their maximum gain. The sample and hold units 26 and 27 are set to continually pass the signals from amplifiers 22 and 23 to the switch inputs, respectively at 28 and 29. The electronic switch 30 alternates so that the line 31 is connected successively to input line 28 and then 29. ADC 33 continually monitors the voltage at line 31 until the voltage on both lines 28 and 29 has reached a constant level thereby indicating that all capacitances in the amplifiers have reached a quiescent level.

(d) After the quiescent level is reached, electronic switch 30 is set to pass the signal on line 28. The processor 40 continues to monitor the output 34 of ADC 33 until the signal has exceeded a predetermined threshold, thereby indicating that detectors 14 and 15 are receiving an exposure of X-rays.

(e) ADC 33 continues to monitor line 28. If the voltage on line 28 rises to a value close to the system power supply then the amplifiers 22 and 23 are close to saturation and liable to give erroneous results. In this case, the processor 40 reduces the gain of the amplifiers 22 and 23 by sending appropriate signals to the gain controller 47. If the voltage on line 28 continues to rise to values near saturation, processor 40 will continue to reduce the gain of amplifiers 22 and 23. If the voltage on line 28 begins to fall, thereby indicating the end of the exposure, or if the amplifiers 22 and 23 are near saturation at the lowest gain setting, or if 300 milliseconds (the maximum calculation loop time of the processor) has elapsed since the beginning of the exposure, then the processor 40 will activate the sample and hold circuits 26 and 27 and the electronic switch 30 so that ADC 33 will measure the sampled signal from both sources 28 and 29. These measurements will be proportional to the energy received by detectors 14 and 15, respectively.

(f) The motor 51 is turned on and position sensor 53 is monitored by the processor 40. The motor is turned off when the position of the filter wheel is such that a thick absorber 13 corresponding to the selected range is over detector 15 and a thin absorber 12 is over detector 14. These absorbers correspond to the range switch 63 setting.

(g) The voltage on lines 28 and 29 are monitored as in step (c) until a quiescent level has been reached.

(h) The quiescent voltage levels on both lines 28 and 29 are offset errors or drifts and are respectively measured by ADC 33.

(i) The offset errors recorded in step (h) are subtracted from the corresponding measured signals recorded in step (e) to provide a corrected and accurate measure of the X-ray energy received by each detector 14 and 15. The processor then divides the corrected signal from detector 15 by the corrected signal from detector 14, and then computes the logarithm of said division. This computation completes the calibration of the instrument and the user is informed by display 66 which displays the letters "CAL".

(j) The signal on line 28 is monitored as in step (d) by ADC 33 until said predetermined threshold is exceeded thereby indicating that the user has made a second exposure of X-rays.

(k) Processor 40 then sets controller 47 to give the gain in amplifiers 22 and 23 that did not cause saturation in the course of step (e) above. ADC 33 continues to monitor the voltage on line 28 until said voltage beings to fall or until it reaches the same maximum value as was reached in the previous exposure in step (e), whereupon processor 40 will activate the sample and hold 26 and 27 and electronic switch 30 so that the ADC 33 will measure the sampled signal on both lines 28 and 29. These measurements respectively correspond to the energy received by detectors 14 and 15. Detector 15 will receive less energy than detector 14 since absorber 13 is thicker than absorber 12.

(l) Offset errors recorded in step (h) are subtracted from the corresponding measured signals recorded in step (k) above. As in step (i) above, the corrected signals are divided and the logarithm of the quotient of said division is computed.

(m) The logarithm computed in step (i) is subtracted from the logarithm computed in step (l). The difference between logarithms (called DL) corrects for any gain differences in the detectors or associated electronics, or any nonuniformities in the radiation striking the detectors.

(n) The computed value DL from step (m) is used in the following formula to compute the kilovoltage of the radiation source, although an equivalent calibration or a table look-up procedure may alternatively be used.

$$KV = K\left(\frac{(DL/K_1) + K_4}{(DL/K_1 + K_2 + K_3)^2}\right)^{\frac{1}{3}}$$

where the parameters $K_1$, $K_2$, $K_3$ and $K_4$ are empirically determined. Values $K_1$ and $K_2$ are slightly adjusted for each set of filters. These adjustments are necessary due to the difficulty in obtaining absorbers with a tightly controlled thickness tolerance. Said adjusted values are read into the processor from ADC 55 connected to several potentiometers 54. The potentiometers 54 are set during initial factory calibration of the present invention.

(o) The KV computation with filter thickness corrections is transmitted by means of display interface 58 to the front panel display 59. The program then branches back to step (a) above so that the sequence can be repeated.

In FIGS. 3A and 3B, the details of the mechanical design of the detector box 60 of the present invention are shown. Radiation striking the detector box first passes through a pre-collimator 100 which consists of a lead sheet with two holes 101 and 102 so that X-rays may strike the detectors. Holes 101 and 102 are smaller than the absorber disk diameter. Absorbers 12 and 13 are mounted on the filter wheel 52 and are located between the pre-collimator 100 and lead post-collimators 103 and 104. The holes 105 and 106 on post-collimators 103 and 104 are nominally the same diameter as the active area of the detectors 15 and 16. Post-collimators 103 and 104 along with lead shields 107 and 108 completely surround detectors 15 and 16 to prevent stray scattered radiation from being detected. Sensitive amplifiers 71 and 72 having low offset current are also enclosed in post-collimators 103 and 104. Additional electronic components are mounted on printed circuit board 112.

In FIG. 3B, three sets of light emitting diodes (LED) 109 and photo-transistors 110 mounted at the edge of filter wheel 52 are shown. Said LEDs illuminate the top of filter wheel 52 while phototransistors 110 detect the LED energy only if the filter wheel 52 is in a position such that small position encoding holes 111 in filter wheel 52 are directly between the LED 109 and associated phototransistor 110. The position encoding holes 111 and said sets of LEDs and phototransistors comprise the filter wheel position sensor 53 shown in FIG. 1.

Figure 4:
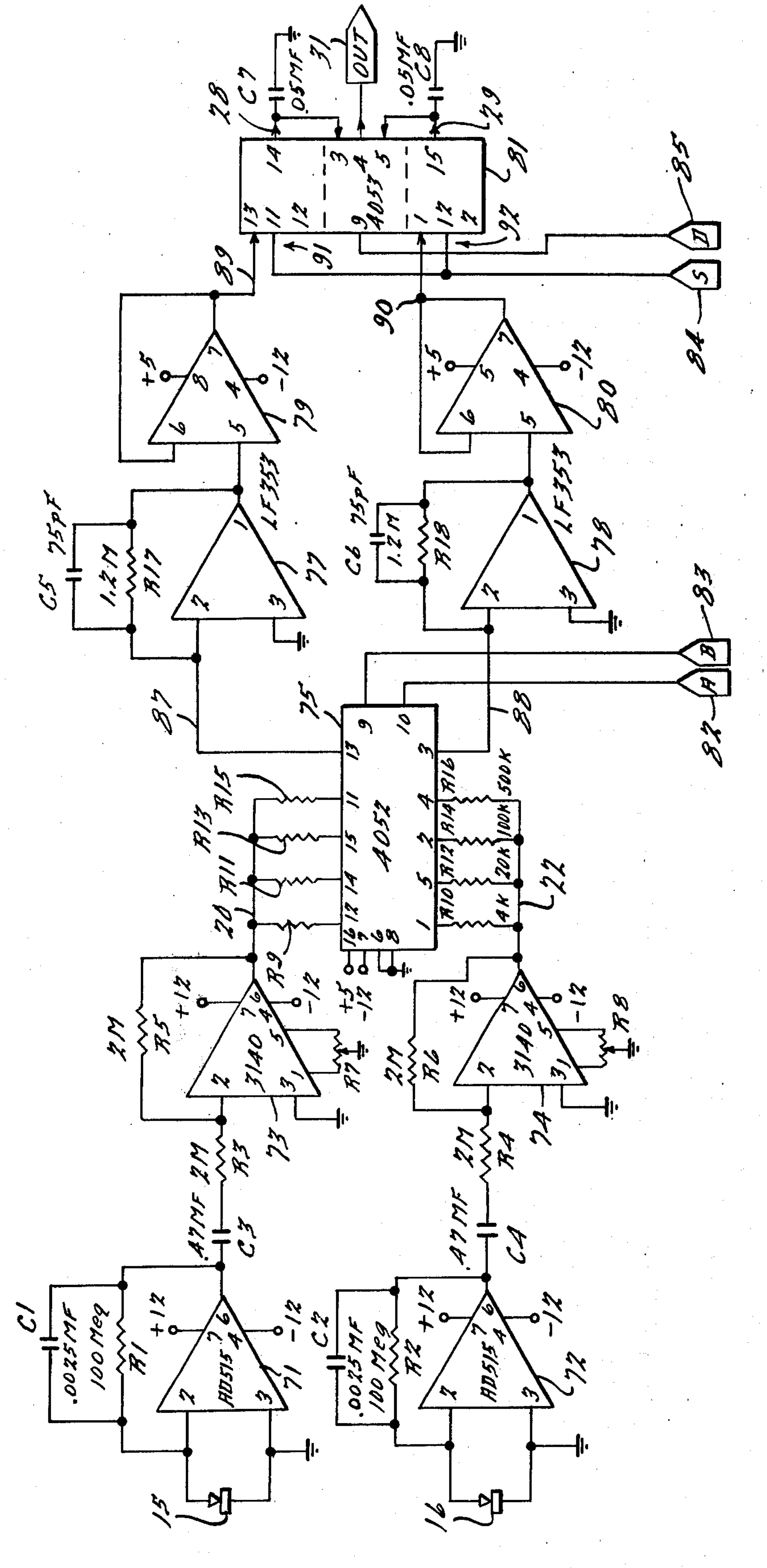
FIG. 4 is a schematic diagram of the electronic circuitry in the detector box shown in FIG. 3A.

Referring now to FIG. 4, a detailed schematic of the electronic circuitry in the detector box 60 is shown. Detectors 15 and 16 are preferably type number PV-444A manufactured by EG&G Corporation, and are respectively connected to amplifiers 71 and 72, which are preferably type number AD515JH. Feedback components R1 and C1 connected to amplifier 71 give rise to an integrating time constant of 0.25 seconds. The output of amplifier 71 is AC coupled by capacitor C3 to a unity gain amplifier comprised of amplifier 73, resistors R3 and R5, and offset trim potentiometer R7. In the preferred embodiment, capacitor C3 and resistor R3 provide a time constant of approximately one second. Collectively, amplifiers 71 and 73 along with components C1, C3, R1, R3, R5, and R7 comprise the AC coupled integrating preamplifier 18 shown in FIG. 1. Similarly amplifiers 72 and 74 along with components C2, C3, R2, R4, R6, and R8 comprise preamp 19 shown in FIG. 1.

The output 20 of preamplifier 18 is connected to four resistors R9, R11, R13, and R15 shown in FIG. 4. These four said resistors are respectively connected to four inputs of multiplexer 75. One resistor connected to the inputs of multiplexer 75 will be selected and connected by action of the multiplexer 75 to output line 87 in accordance with the status of control lines 82 and 83. Said selected resistor is thereby connected through line 87 to the negative input of amplifier 77. Feedback resistor R17 is connected from said negative input to the output of amplifier 77. Said selected input resistor and feedback resistor R17 together determine the gain of amplifier 77. Resistors R9, R11, R13, and R15 in conjunction with R17 are chosen to respectively provide gains of 300, 60, 12, and 2.4. Resistor R9 is selected when control lines 82 and 83 are both logic zero. Resistor R11 is selected when lines 82 and 83 are respectively logic one and logic zero. And resistor R15 is selected when lines 82 and 83 are both logic one. The status of control lines 82 and 83 are determined by gain controller 47 in FIG. 1. Collectively multiplexer 75, resistors R9, R11, R13, R15 and R17 along with amplifier 77, filter capacitor C5, and buffer amplifier 79 comprise the variable gain amplifier 22 shown in FIG. 1. Similarly, components 75, R10, R12, R14, R16, R18, C6, 78, and 80 comprise the variable gain amplifier 23. Note that both amplifiers 22 and 23 will provide the same nominal gain by action of control lines 82 and 83.

Returning to FIG. 4, multiplexer 81 is preferably type number CD4053 and contains three independent sections. A first section of multiplexer 81 has two inputs 89, and 91 and an output 28. Multiplexer 81 can cause either input 89 or 91 to be selected and connected to output 28 in accordance with the status of control line 84. When control line 84 is a logic one then the output 89 of amplifier 79 is selected and connected to output 28, thereby causing capacitor C7 to charge to the voltage value on line 89. If control line 84 is changed to a logic zero then the input is connected to output line 28. Input 91 is left unconnected so that capacitor C7 cannot discharge and will thereby hold the voltage value that was on line 89 just prior to the transition of the control line 84 from logic one to logic zero. Collectively, capacitor C7 and said first section of multiplexer 81 comprise the sample and hold circuit 26 shown on FIG. 1.

In a similar fashion sample and hold circuit 27 is comprised of capacitor C8 in conjunction with a second section of multiplexer 81 with input lines 90 and 92, output line 29 and control line 84.

A third section of multiplexer 81 has inputs 28 and 29, respectively, connected to the outputs of the first and second sections of multiplexer 81. One of the inputs 28 or 29 can be selected and connected to output 31 by multiplexer 81 in accordance with the status of control line 85. The third section of multiplexer 81 comprises the electronic switch 30 shown in FIG. 1.

While the above description constitutes the preferred embodiment of the present invention, it will be appreciated that the invention is susceptible to modification, variation and change without departing from the proper scope or fair meaning of the accompanying claims.

What is claimed is:

1. A method for measuring the applied kilovoltage of an X-ray source using a pair of detector channels, each comprising a detector and associated processing circuitry, and a plurality of absorbers including the steps of:

taking a first measurement of the X-ray intensities detected by said detectors through a first pair of absorbers of equal thickness during a first X-ray exposure, taking a second measurement of the X-ray intensities detected by said detectors through a second pair of absorbers of unequal thickness during a second X-ray exposure, modifying said second measurement in accordance with said first measurement to compensate for any differences in the characteristics between the two detector channels, and deriving the applied kilovoltage from the difference of said subtraction.

2. The method of claim 1 wherein said first and second measurements comprise the logarithm of the ratio of the signals detected by said pair of detectors during said first and second X-ray exposures, respectively.

3. The method of claim 1 further including the steps of taking a third measurement of the quiescent level of the processing circuitry for said detectors and subtracting said third measurement from each of said first and second measurements.

4. A method of measuring the applied kilovoltage of an X-ray source using a pair of detectors and a plurality of absorbers including the steps of:

measuring the X-ray intensities detected by said detectors during a first exposure with said detectors filtered by a pair of absorbers of equal thickness, calculating the logarithm of the ratio of the measurements of said detectors during said first exposure, storing the result of the calculation, measuring the X-ray intensities detected by said detectors during a second exposure with said detectors filtered by a pair of absorbers of unequal thickness, calculating the logarithm of the ratio of the measurements of said detectors during said second exposure, subtracting the result of the first calculation from the result of the second calculation, and deriving the applied kilovoltage from the difference of said subtraction.

5. An apparatus for measuring the applied kilovoltage of an X-ray source including:

a pair of detectors for detecting the intensities of the X-ray beam;

a plurality of absorbers for filtering the X-ray beam;

means for positioning pairs of said absorbers into operative relationship over said detectors;

processing means for processing the measurements made by said detectors;

storage means for storing measurements; and microcomputer means for calculating the logarithm of the ratio of the measurements made by said detectors using a first exposure when said detectors are filtered by a pair of absorbers of equal thickness, storing the result of said calculation in said storage means, calculating the logarithm of the ratio of the measurements made by said detectors during a second exposure when said detectors are filtered by a pair of absorbers of unequal thickness, subtracting the stored result of the first calculation from the result of the second calculation, and deriving the applied kilovoltage from the difference.

6. The apparatus of claim 5 wherein said microcomputer means is further adapted to measure the quiescent state of said processing means and subtract said quiescent state measurement from the detector measurements made during said first and second exposures prior to calculating the logarithms of the ratios of said measurements.

7. The apparatus of claim 6 wherein said processing means includes an integrating preamplifier connected to each of said detectors.

8. The apparatus of claim 7 wherein said processing means further includes a variable gain amplifier a.c. coupled to each of said integrating preamplifiers.

* * * * *

UNITED STATES PATENT AND TRADEMARK OFFICE
CERTIFICATE OF CORRECTION

PATENT NO. : 4,355,230
DATED : October 19, 1982
INVENTOR(S) : Stephen S. Wilson et al.

It is certified that error appears in the above—identified patent and that said Letters Patent is hereby corrected as shown below:

Column 1, line 66, "HLV" should be --HVL--.
Column 3, line 5, "by" should be --from--.
Column 3, line 45, "for" should be --of--.
Column 6, line 50, "beings" should be --begins--.
Column 10, line 22, Claim 5, "using" should be --during--.

Signed and Sealed this

*Eighth* Day of *March 1983*

[SEAL]

*Attest:*

GERALD J. MOSSINGHOFF

*Attesting Officer* *Commissioner of Patents and Trademarks*